United States Patent
Crabtree

[19]

[11] Patent Number: 5,861,075

[45] Date of Patent: Jan. 19, 1999

[54] TABLE TOP DISPLAY AND METHOD OF MAKING

[75] Inventor: William M. Crabtree, Sedalia, Mo.

[73] Assignee: A.B.C. Advertising Agency, Sedalia, Mo.

[21] Appl. No.: 816,481

[22] Filed: Mar. 13, 1997

[51] Int. Cl.⁶ .................................................. B32B 31/00
[52] U.S. Cl. ............................ 156/277; 428/13; 428/187; 428/195
[58] Field of Search ................................. 428/13, 15, 67, 428/76, 187, 195; 156/277

[56] References Cited

U.S. PATENT DOCUMENTS

| | | | |
|---|---|---|---|
| 2,807,909 | 10/1957 | Schult, Sr. ............................. | 40/525 X |
| 3,062,604 | 11/1962 | Hodgen ..................................... | 428/49 |
| 3,212,952 | 10/1965 | Turner ...................................... | 428/38 |
| 3,610,175 | 10/1971 | Wilton et al. ..................... | 428/913.3 X |
| 3,920,870 | 11/1975 | Ackerman et al. ........................ | 428/46 |
| 4,393,104 | 7/1983 | Fink .......................................... | 428/7 |
| 4,484,745 | 11/1984 | Sleeper ............................... | 428/900 X |
| 4,617,215 | 10/1986 | Telesco ..................................... | 428/43 |
| 4,944,968 | 7/1990 | Wagner ..................................... | 428/13 |
| 5,484,638 | 1/1996 | Crabtree ................................... | 428/67 |

*Primary Examiner*—Henry F. Epstein
*Attorney, Agent, or Firm*—Hovey, Williams, Timmons & Collins

[57] ABSTRACT

A method of creating table top displays (10) for decorating or displaying advertisements on table tops (12) is disclosed. The method prints an image or design (16) on a single piece of substrate (14) that is nearly as large as the table top to be covered. The substrate is then covered with one or more laminate layers (24,26) and adhered to the upper surface of a table top. The laminated substrate is then coated with one or more layers of clear sealant (18). The sealant layer is applied in a manner to resist cracking and chipping.

8 Claims, 1 Drawing Sheet

TABLE TOP DISPLAY AND METHOD OF MAKING

BACKGROUND OF THE INVENTION

1. Field of the Invention

The present invention relates to table top displays for displaying advertisements, drawings, photographs and other designs on table tops. More particularly, the present invention relates to an improved method of creating such table top displays.

2. Description of the Prior Art

Table tops having advertisements, drawings or displays thereon are commonly used in restaurants and other retail establishments. However, known table top displays suffer from several limitations.

For example, known table displays typically include numerous small advertisements, photos, or drawings arranged on the table top. These small displays must be individually created and then arranged on and adhered to the table top. These steps are time consuming and therefore limit the number of table top displays that can be efficiently created.

Another limitation of known table top displays is that they include sealant coatings placed over the designs to protect the designs from liquids placed on the table tops. Unfortunately the sealant coatings, which are typically made of epoxy, often damage the images on the advertisements, photos, or drawings.

Moreover, the sealant coatings on prior art table top displays often cover the entire upper surface of the table top and extend over and wrap around a portion of the side edges of the tables. Although this effectively seals the entire upper surface and side edges of the tables from liquids placed on the table, the sealant coatings often becomes chipped or cracked when chairs or other objects are pushed up against the sides of the tables.

OBJECTS AND SUMMARY OF THE INVENTION

In view of the foregoing, it is an object of the present invention to provide an improved table top display and an improved method of making the same.

It is a more particular object of the present invention to provide a method of making table top displays that is faster and easier than prior art methods.

It is another object of the present invention to provide a table top display having a sealant coating that does not damage the images on the underlying advertisements, photographs, and drawings.

It is another object of the present invention to provide a table top display having a sealant coating that resists chipping and cracking.

The present invention achieves these objects and other objects that become evident from the description of the preferred embodiments of the invention herein by providing an improved method of creating a display on a table top. The preferred method broadly includes the steps of:

(a) printing an image on the upper surface of a substrate;

(b) applying a sheet of laminate over the upper surface of the substrate;

(c) applying a layer of adhesive to a portion of the upper surface of the table top;

(d) adhering the lower surface of the substrate to the adhesive layer on the table top to affix the substrate to the table top; and (e) applying a layer of sealant over the sheet of laminate, substrate, and adhesive layer.

The image is printed on the substrate with a color printer. The substrate may have any surface area size up to the surface area of the table top. This allows the table top to be covered by a design or drawing printed on a single piece of substrate rather than by numerous smaller designs or drawings, thus significantly reducing the time required to create a table top display.

In preferred forms, the sealant layer is applied to the table top so that it covers the substrate and substantially all of the uppermost surface of the table top but does not extend over the side edges of the table top. This prevents the sealant layer from becoming chipped or cracked when chairs or other objects are pushed against the table top. Since the image on the substrate is covered with a sheet of laminate before the substrate is covered with the sealant layer, the image is protected from the sealant layer and therefore does not bleed or blur.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

Figure 1:
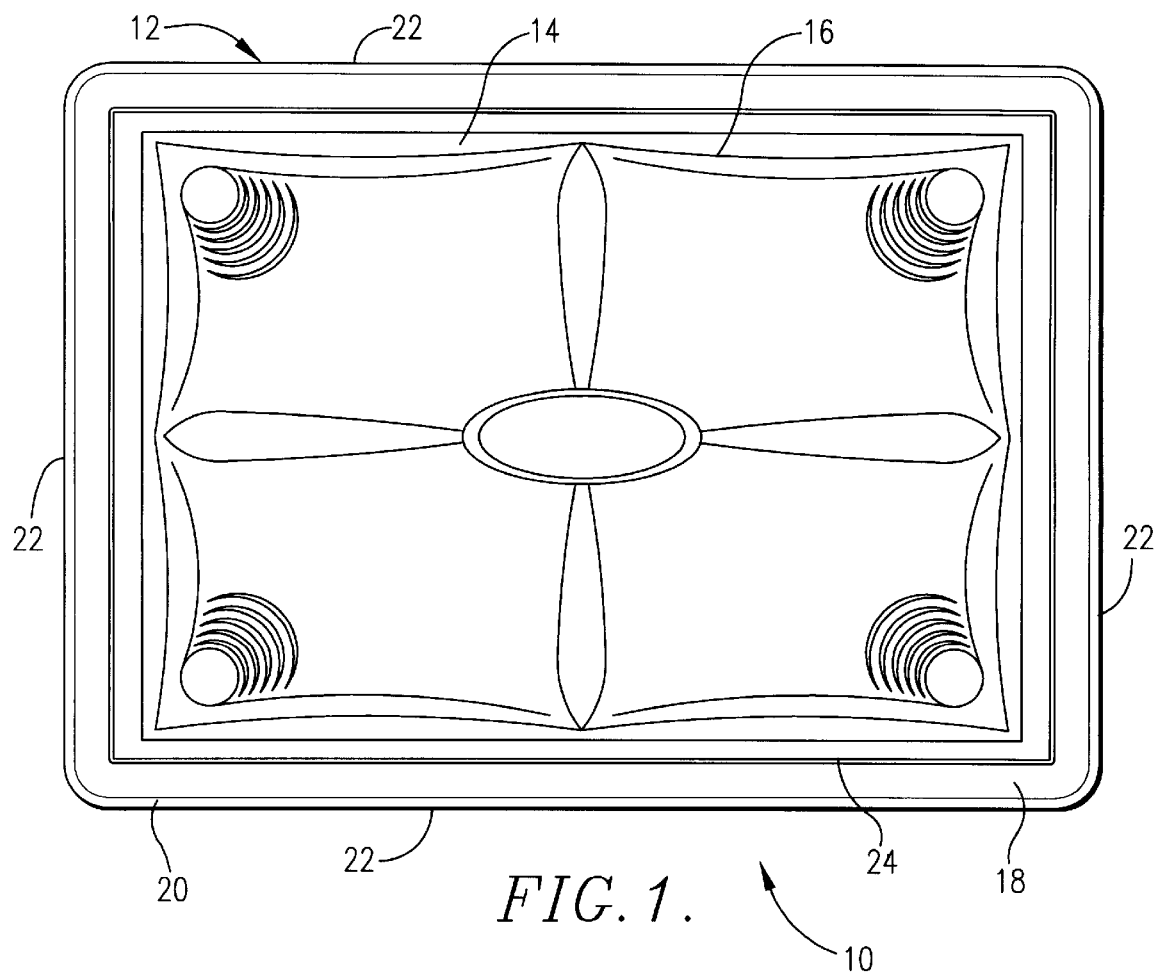
FIG. 1 is a perspective view of a table top display constructed in accordance with a preferred embodiment of the present invention.

The drawing figures illustrate a table top display 10 constructed in accordance with a preferred embodiment of the invention. The table top display 10 broadly includes a table top 12, a substrate 14 having images or designs 16 printed thereon, and a sealant coating 18 covering the substrate and a portion of the table top. The thickness of the individual layers on top of the table top 12 are exaggerated in FIG. 2 for clarity.

In more detail, the table top 12 is entirely conventional and may be formed of any suitable material. The table top 12 has an upper surface 20 and four side edges 22 extending downwardly from the outer margins of the upper surface. The method of the present invention may be performed on new table tops as they are manufactured or may be performed on existing table tops in use in restaurants or other retail establishments.

The substrate 14 is preferably formed of conventional paper or wax paper material but may also be formed of canvass or other suitable material. The images or designs 16 are preferably printed on the substrate 14 in water soluble color ink with a large ink jet printer. The pattern for the designs may be selected as a matter of design choice.

The substrate 14 may be of any size equal or less than the surface area of the table top. In one embodiment of the invention, the substrate is sized so that it extends to within ¼"–½" of the side margins of the table top 12 to permit the images or designs 16 to cover substantially the entire surface area of the upper surface 20 of the table top. In preferred forms, the substrate 14 is approximately 36" wide for placement on a table top 12 which is slightly greater than 36" wide.

Once the images or designs 16 are printed on the substrate 14, an upper laminate layer 24 having adhesive on its lower surface is applied over the upper surface 20 of the substrate. The laminate layer 24 prevents the sealant coating 18 from migrating into the images or designs 16 printed on the substrate 14 and thus prevents blurring or bleeding of the images or designs.

Figure 2:
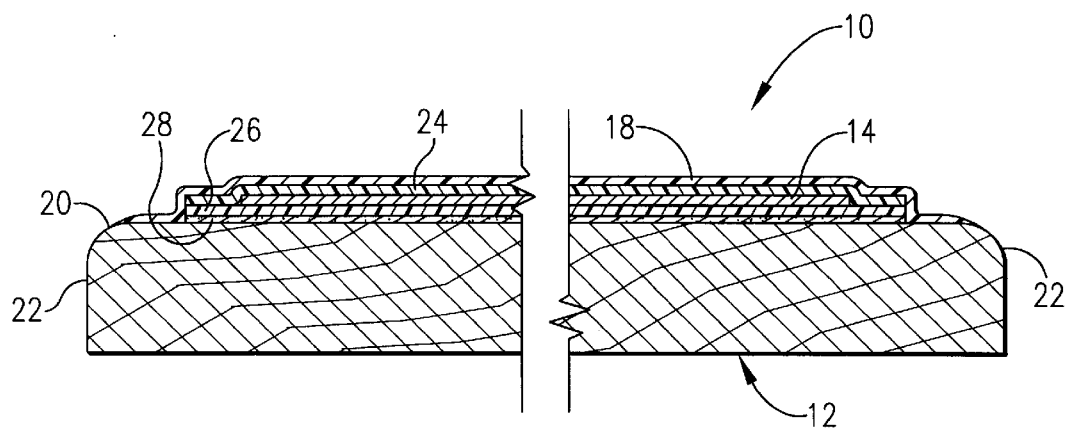
FIG. 2 is a fragmented side-sectional view of the table top display depicting the layers on the upper surface of the table top.

In an alternate embodiment of the invention, a lower laminate layer 26 may be attached to the lower surface of the substrate 14 so that the substrate is sandwiched between a pair of laminate layers as illustrated in FIG. 2. In this embodiment, neither laminate layer 24,26 has adhesive thereon; instead, the edges of the laminate layers are adhered together in a hot melt process or a cold adhesive process.

The substrate 14 and the laminate layers 24,26 are next adhered to the upper surface 20 of the table top 12 by a layer of adhesive 28 that is applied to a portion of the upper layer 24 of the table top. A layer of adhesive 28 may also be applied to the lower surface of the substrate 14 (when only one laminate layer is adhered to the substrate) or to the lower laminate layer 26 (when two laminate layers envelop the substrate).

To ensure that the laminated substrate 14 lies flat on the table top 12 and to remove air from between the laminated substrate and the upper surface 20 of the table top, a roller or other object may be rolled across the upper surface of the laminated substrate once it has been placed on the table top.

Finally, one or more layers of sealant coating 18 are applied over the laminated substrate 14 in a conventional manner to seal the table top display 10. The sealant coating 18 is preferably an epoxy material. Once the sealant coating 18 has been applied over the laminated substrate 14, it may be heated with a blow torch or other heating means to remove air bubbles therefrom.

As illustrated in the drawing figures, the sealant coating 18 is preferably applied so that it covers substantially all of the uppermost surface of the table top 12 without extending over the side edges 22 of the table top. As discussed above, this prevents the sealant coating 18 from chipping or cracking when chairs or other objects are pushed up against the side edges 22 of the table top 12.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of creating a display on a table top having an upper surface, the method comprising the steps of:

(a) printing an image on the upper surface of a substrate;
 (b) adhering a laminate having adhesive on its lower surface over the upper surface of the substrate to protect the image on the upper surface of the substrate;
 (c) adhering the lower surface of the substrate to the upper surface of the table top; and
 (d) applying a layer of sealant over the laminate and substrate.

2. The method as set forth in claim 1, step (b) further including the step of placing a laminate over the lower surface of the substrate.

3. The method as set forth in claim 1, step (c) including the step of applying a layer of adhesive to a portion of the upper surface of the table top and to the lower surface of the substrate.

4. The method as set forth in claim 1, further including, after step (c), the step of rolling a roller across the upper surface of the laminated substrate to remove air from between the substrate and the upper surface of the table top to flatten the substrate on the table top.

5. The method as set forth in claim 1, the upper surface of the table top having a surface area, wherein the substrate has a surface area only slightly less than the table top surface area.

6. The method as set forth in claim 1, the table top having four side edges extending downwardly from the table top upper surface, wherein the layer of sealant is applied to the table top so that it covers substantially all of the uppermost surface of the table top but does not extend over the side edges.

7. The method as set forth in claim 1, further including, after step (d), the step of heating the layer of sealant to remove air bubbles therefrom.

8. The method as set forth in claim 1, wherein the image is printed on the substrate with a color printer.

\* \* \* \* \*

REEXAMINATION CERTIFICATE (4128th)

United States Patent [19]
Crabtree

[11] B1 5,861,075
[45] Certificate Issued Aug. 1, 2000

[54] TABLE TOP DISPLAY AND METHOD OF MAKING

[75] Inventor: William M. Crabtree, Sedalia, Mo.

[73] Assignee: A.B.C. Advertising Agency, Sedalia, Mo.

Reexamination Request:
No. 90/005,373, May 27, 1999

Reexamination Certificate for:
Patent No.: 5,861,075
Issued: Jan. 19, 1999
Appl. No.: 08/816,481
Filed: Mar. 13, 1997

[51] Int. Cl.[7] .................................................. B32B 31/00
[52] U.S. Cl. ........................... 156/277; 428/13; 428/187; 428/195
[58] Field of Search ................................... 156/277, 278, 156/280, 82; 428/13, 15, 67, 76, 187, 195

[56] References Cited

U.S. PATENT DOCUMENTS 4,515,831  5/1985  Wille .
5,464,681  11/1995  Luce .
5,484,638  1/1996  Crabtree .

OTHER PUBLICATIONS

"Sightings", UFO Systems, Inc., vol. 3, Issue 1, dated Dec. 1995.

"ABC Newsletter", ABC Advertising Agency, Inc., Nov./Dec. 1996.

*Primary Examiner*—M. Curtis Mayes

[57] ABSTRACT

A method of creating table top displays (10) for decorating or displaying advertisements on table tops (12) is disclosed. The method prints an image or design (16) on a single piece of substrate (14) that is nearly as large as the table top to be covered. The substrate is then covered with one or more laminate layers (24,26) and adhered to the upper surface of a table top. The laminated substrate is then coated with one or more layers of clear sealant (18). The sealant layer is applied in a manner to resist cracking and chipping.

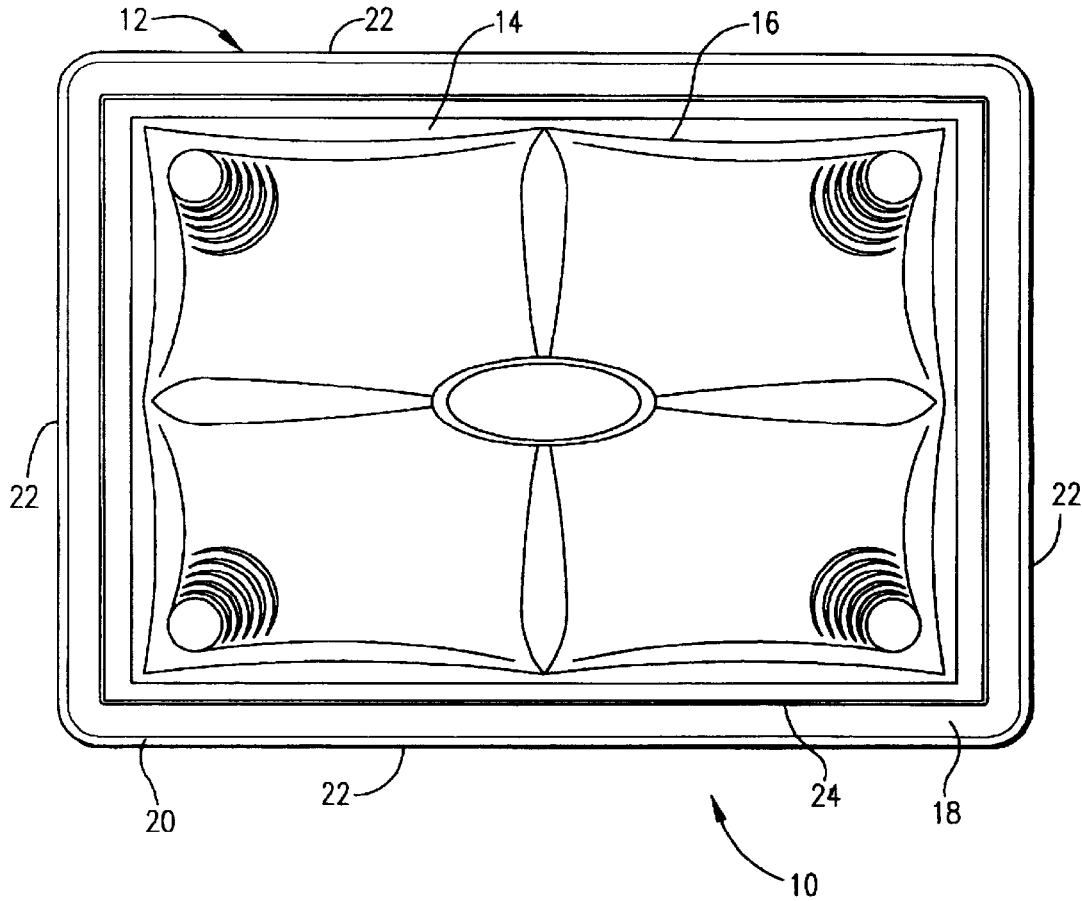

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *